(12) United States Patent
Chen

(10) Patent No.: US 6,360,568 B1
(45) Date of Patent: Mar. 26, 2002

(54) AUTOMOBILE STEERING LOCK

(76) Inventor: Tian-Yuan Chen, P.O. Box 90, Tainan City (TW)

( * ) Notice: Subject to any disclaimer, the term of this patent is extended or adjusted under 35 U.S.C. 154(b) by 0 days.

(21) Appl. No.: 09/852,346

(22) Filed: May 11, 2001

(51) Int. Cl.[7] .............................................. B60R 25/02
(52) U.S. Cl. ............................ 70/209; 70/226; 70/237
(58) Field of Search ........................... 70/209–212, 225, 70/226, 237, 238; 180/287

(56) References Cited

U.S. PATENT DOCUMENTS

| | | | | |
|---|---|---|---|---|
| 5,097,685 A | * | 3/1992 | Lien | 70/209 |
| 5,609,050 A | * | 3/1997 | Yu | 70/209 |
| 5,671,619 A | * | 9/1997 | Hou | 70/209 |
| 5,676,000 A | * | 10/1997 | Chen | 70/209 |
| 5,706,681 A | * | 1/1998 | Gorohkovsky | 70/209 |
| 5,718,133 A | * | 2/1998 | Chen et al. | 70/209 |
| 5,842,360 A | * | 12/1998 | Somerfield | 70/209 |
| 5,875,661 A | * | 3/1999 | Ho | 70/209 |
| 5,921,120 A | * | 7/1999 | Wu | 709/209 |
| 5,996,721 A | * | 12/1999 | Winner | 70/209 X |
| 6,109,076 A | * | 8/2000 | Kajuch | 70/209 |

* cited by examiner

Primary Examiner—Suzanne Dino Barrett

(57) ABSTRACT

An automobile steering lock includes a sector-shaped cover, a locking device combined on the cover and a press rod. The locking device has a lock rod, a disc and a fix block fixed on the cover. And the disc has a hole for the lock rod to move through back and forth by rotating a key for locking and unlocking quickly. The cover can hide the safety air bag and the steering wheel at the same time, and the press rod presses the panel board, so the lock can lock at three directions to elevate locking effect.

5 Claims, 6 Drawing Sheets

AUTOMOBILE STEERING LOCK

BACKGROUND OF THE INVENTION

1. Filed of the Invention

This invention relates to an automobile steering lock, particularly to one provided with a sector-shaped cover, and a locking device fixed on the cover and provided with a movable lock rod, and a press rod pivotally connected to the cover to be pressed on the panel board of an automobile. Then the sector-shaped cover is located on a safety air bag deposited on the steering wheel so that the steering lock may lock the steering wheel in three directions, preventing the steering wheel from rotating right and left, and preventing the lock from being destroyed, practical and convenient to take off for next use.

2. Description of the Prior Art

A known conventional automobile steering lock has an elongate rod to be fitted in two opposite sections of the steering wheel, and locks the elongate rod immovable to keep the steering wheel from rotated. But this kind of steering lock can only lock the steering wheel, impossible to prevent the safety air bag deposited in the center of the steering wheel from being stolen. Besides, if the elongate rod is not properly placed against the inner edge of the ribs of the steering wheel, the steering lock cannot lock correctly, with the steering wheel easily rotated to let an automobile stolen. So another known conventional steering lock has been disclosed by some makers, wholly covering the steering wheel of an automobile to protect both the steering wheel and the safety air bag together. But it cannot quite lock the steering wheel from rotation completely, only locking on the steering wheel, and in addition, a key has to be used for locking and unlocking, cumbersome to use.

SUMMARY OF THE INVENTION

The objective of the invention is to offer an automobile steering lock locking the steering wheel of an automobile in three directions, protecting a safety air bag, and pressing on the panel board of an automobile with a press rod extending rearward from a sector-shaped cover fitted on the steering wheel. Then the steering lock may not be broken by moved right and left, having a simple structure to lower its cost.

The main feature of the invention is a sector-shaped cover combined with a locking device. The cover has a hooking member formed on an upper end to hook on a part of the steering wheel, a press rod extending rearward from the hooking member. A curved member is combined with a lower portion of the cover. The locking device consists of a lock rod, a disc and a fix block. The lock rod has a long slot with a shrinkable engage lug. The disc has a center hole for the lock rod to pass through and move back and forth and also in a center through hole of the fix block to permit the engage lug engage an engage groove in the center hole to lock the locking device. Further, an ear extends from a rear end surface of the disc, having a hole for a fix pin to pivotally connect the ear with the fix block so that the lock rod may rotate rightwards with the pin as a pivot.

BRIEF DESCRIPTION OF DRAWINGS

This invention will be easily understood by referring to the accompanying drawings, wherein.

DETAILED DESCRIPTION OF THE PREFERRED EMBODIMENT

Figure 1:
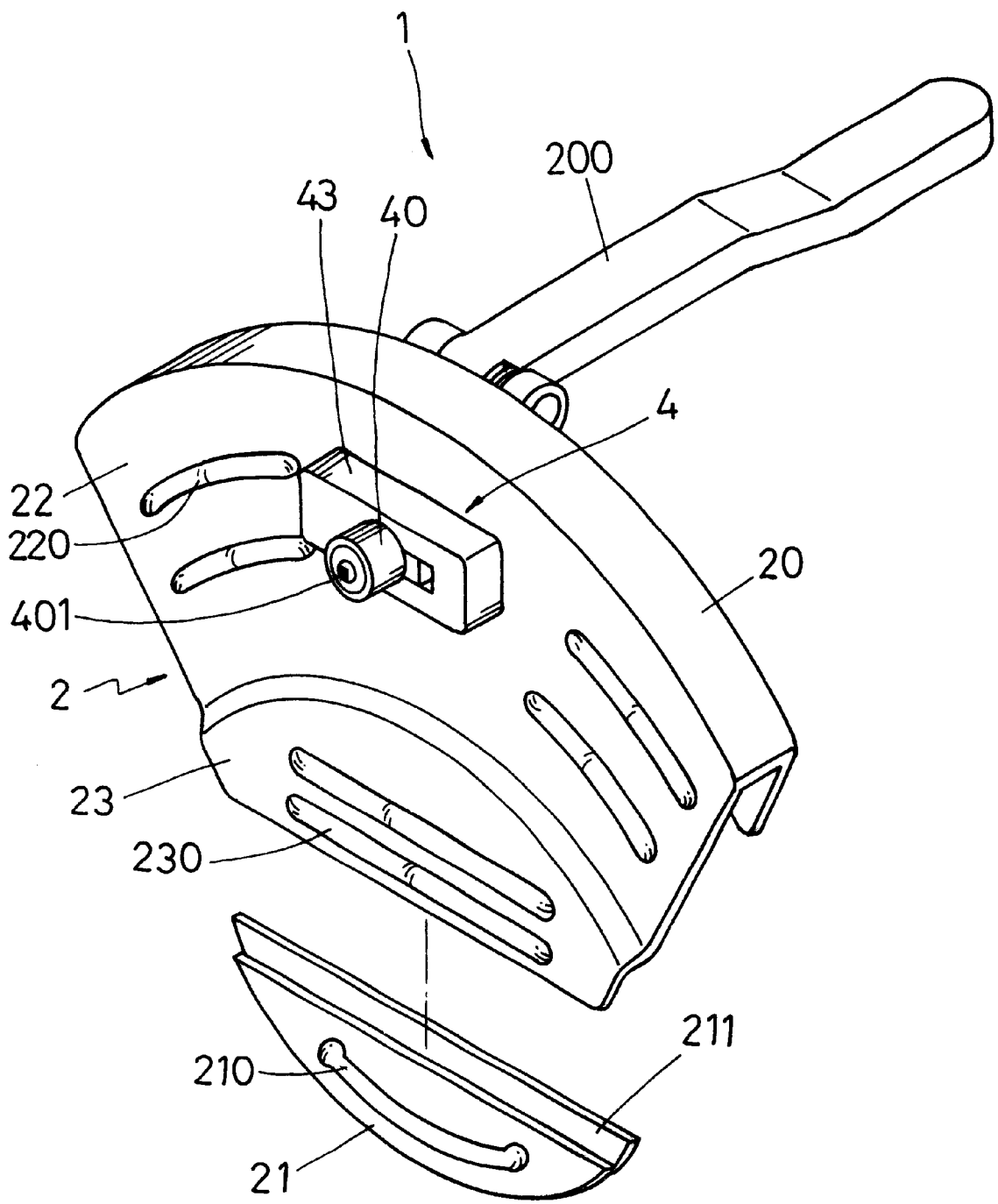
FIG. 1 is an exploded perspective view of an automobile steering lock in the present invention.
Figure 2:
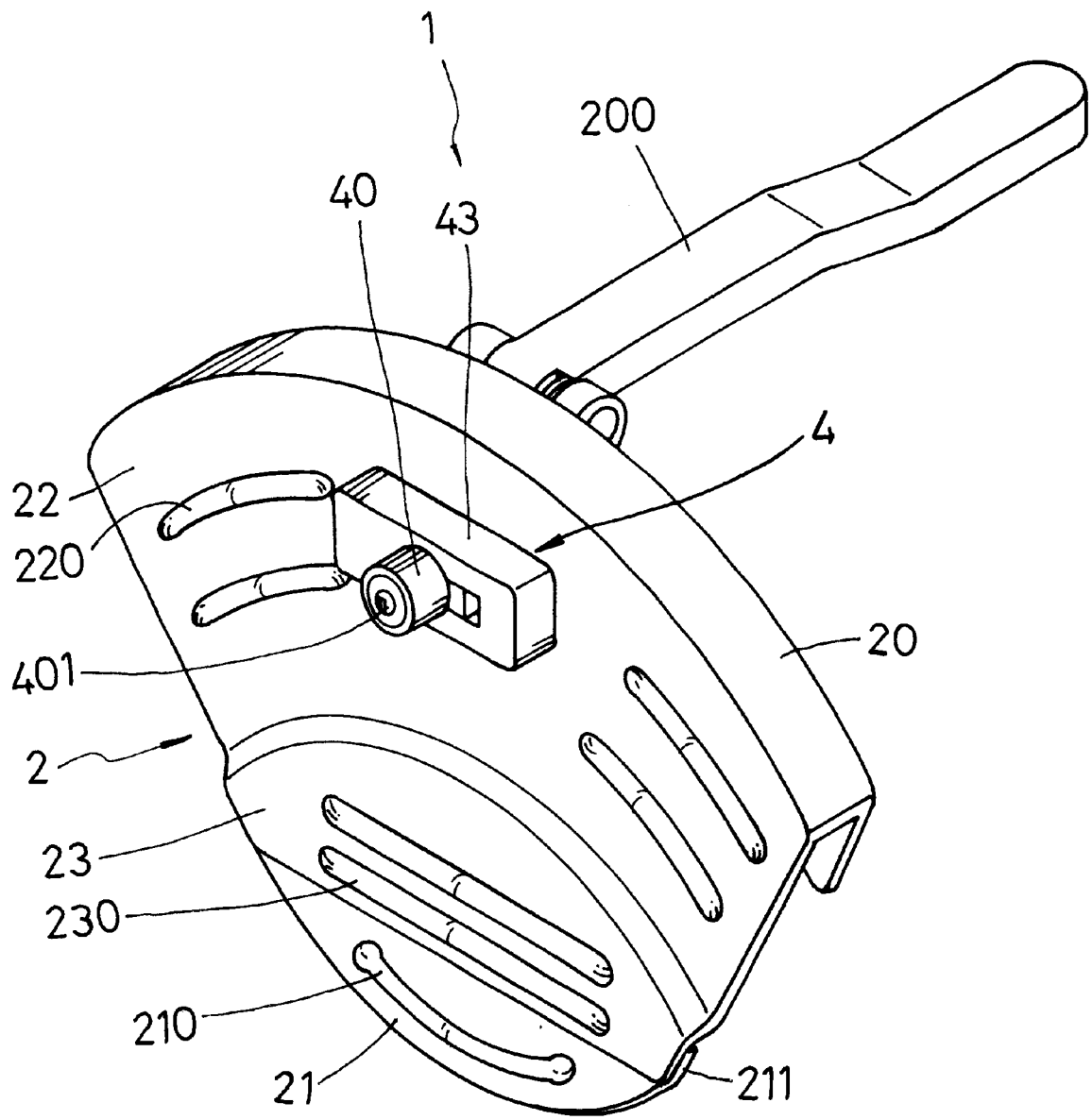
FIG. 2 is a perspective view of the automobile steering lock in the present invention.
Figure 3:
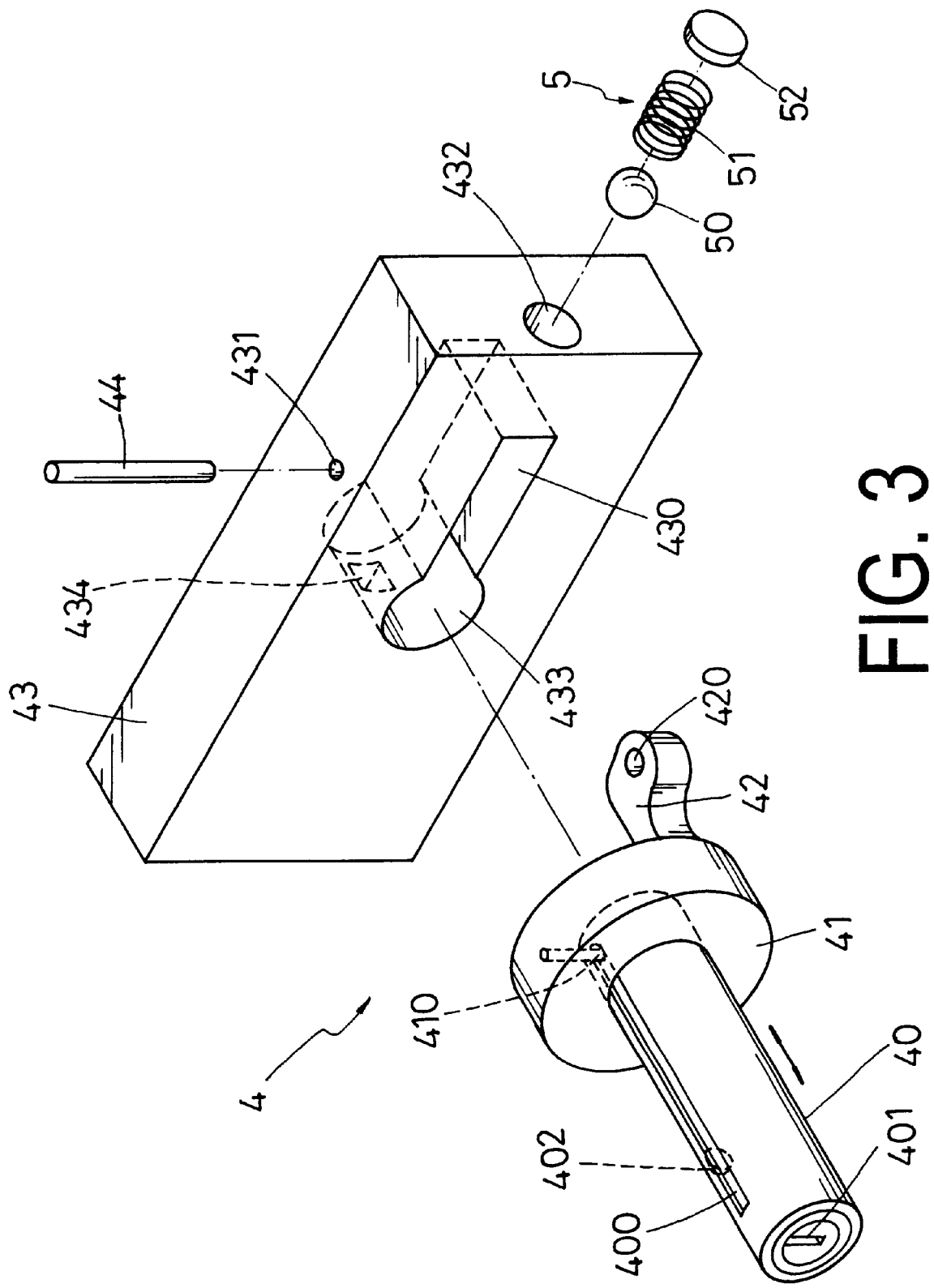
FIG. 3 is an exploded perspective view of a locking device in the present invention.

A preferred embodiment of an automobile steering lock 1 in the invention, as shown in FIGS. 1, 2 and 3, includes a sector-shaped cover 2, a hooking member 20 formed in an upper convex side to hook around a portion of the steering wheel 3 of an automobile and let the cover 2 hide a safety air bag located on the steering wheel 3. Further, a press rod 200 is provided to be pivotally connected to and extending rearward from the center of the hanging member 20, possible to be pressed down tightly on the panel board when the steering lock is in the locked condition. The cover 2 further has a lower portion 23 connected to a curved member 21 provided with a curved reinforcing member 210 fixed on a lower surface, and a recessed straight horizontal surface 211 formed in an upper end section of the curved member 21 and contacting a rear surface of the lower portion 23 and then tightened with rivets or screws or welding to become integral with the lower portion 23. The curved member 21 and the lower portion 23 of the cover 2 form a sector shape with two sides connecting to two sides of the lower portion 23 and to the hooking member 20. The cover 2 further has plural curved reinforcing members 220 respectively on two side portions symmetrically.

Figure 4:
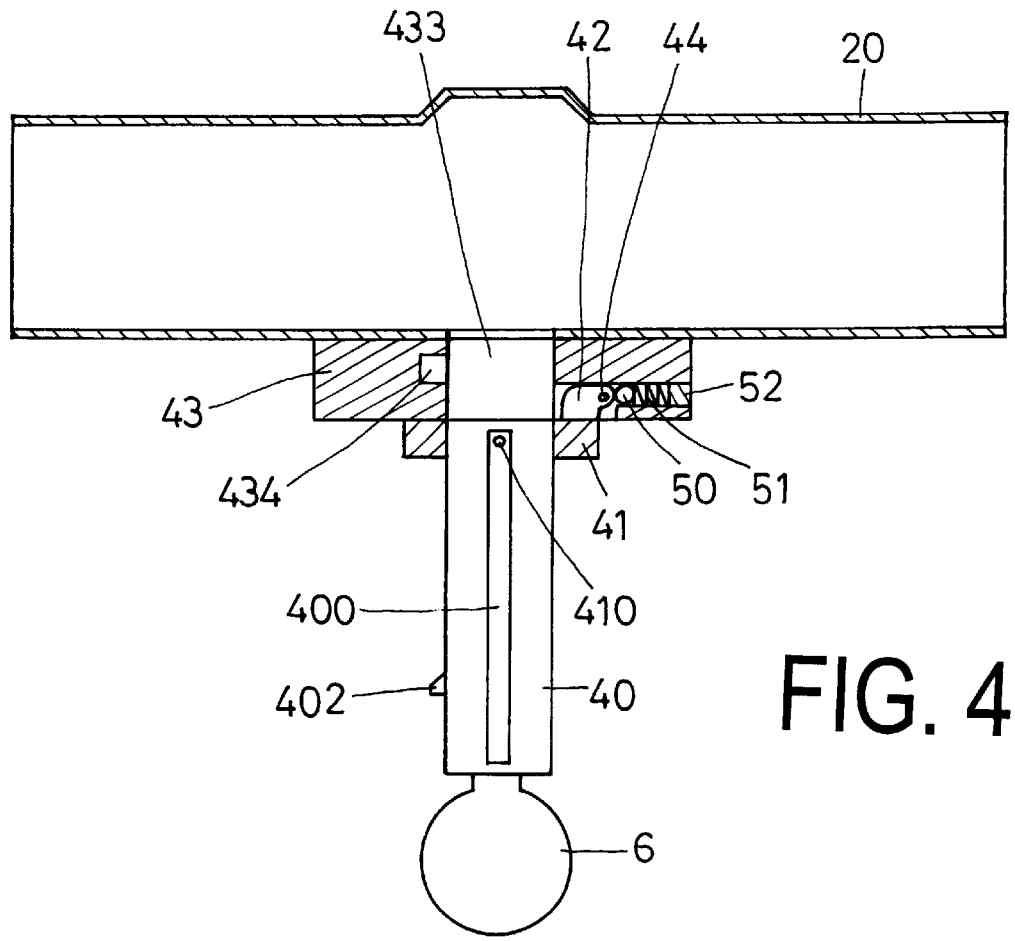
FIG. 4 is an upper exploded view of the locking device not in locking condition in the present invention.
Figure 5:
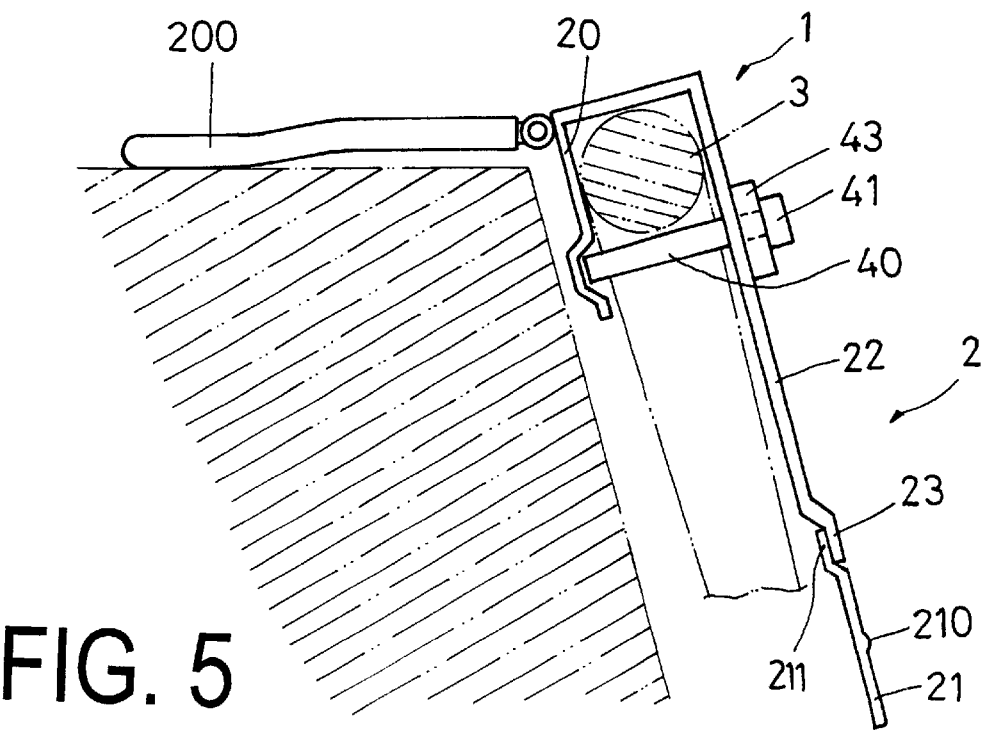
FIG. 5 is a lift cross-sectional view of the locking device in locked condition in the present invention.
Figure 6:
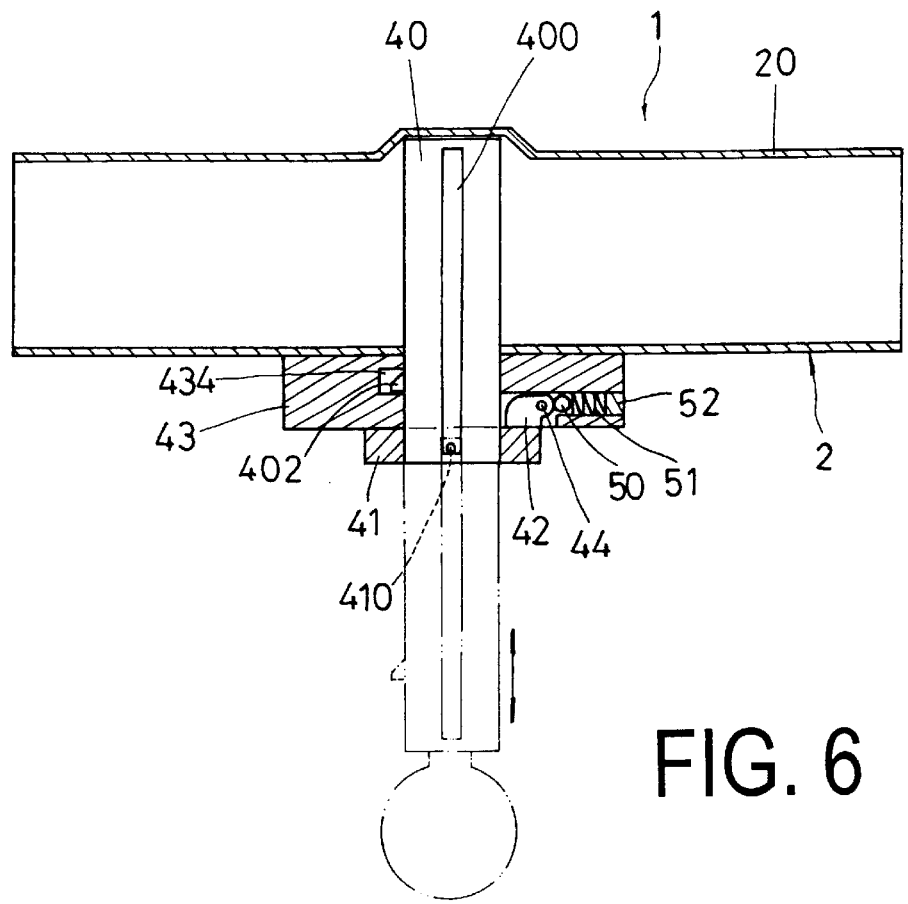
FIG. 6 is a cross-sectional view of the locking device being to be unlocked with a lock rod being moved out in the present invention.
Figure 7:
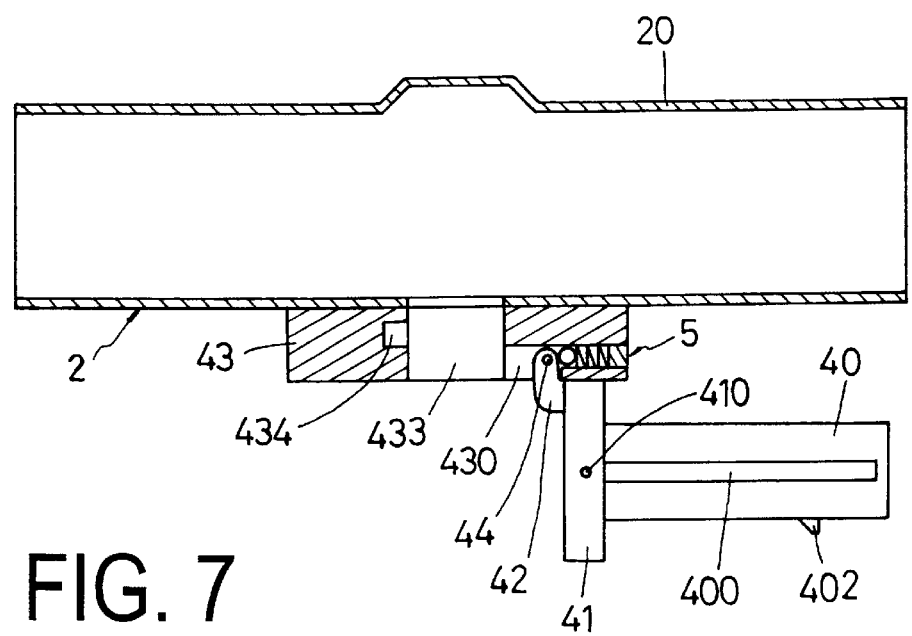
FIG. 7 is an upper cross-sectional view of the lock rod of the locking device being rotated to move in the present invention.

A locking device 4 is fixed on the center of the upper portion 22 of the cover 2, as shown in FIG. 3, having a movable lock rod 40 formed with a slot 400 in an upper end and a keyhole 401 formed in an outer end surface, a locking lug 402 with a sloped face fixed on a proper location in an intermediate portion of the lock rod 40. The locking lug 402 can shrink within the lock rod 40 when a key 6 is inserted in the keyhole 401 to fit in and move back and forth, as shown in FIG. 6. The disc 41 has a stop pin 410 to fit in the slot 400 as shown in FIGS. 3 and 4, preventing the lock rod 40 from falling off the disc 41 in sliding back and forth through the disc 41, and an ear 42 with a hole 420 extending out from a rear right surface. In addition, the fix block 43 is fixed on the cover preferably by welding, having a center hole 433 for the lock rod 40 to move in and out and a lengthwise aperture 430 communicating with the center hole for the ear 42 to move therein. The center hole 433 communicates with a hollow interior of the cover 2 so as to permit the lock rod 40 reach the wall of the cover 2 where the press rod is combined as shown in FIGS. 5 and 6. The fix block 43 further has a pin hole 431 broken in an upper surface, communicating with the aperture 430 and facing the hole 420 of the ear 42 of the disc 41 for a fix pin 44 to insert therein to pivotally connect the ear 42 to the fix block 43 so that the lock rod 40 may rotate rightwards. The center through hole 433 further has an engage groove 434 formed in an inner wall for the engage lug 402 of the lock rod 40 to fit therein for locking, as shown in FIGS. 4 and 6. The fix block 43 further has a hole 432 formed in a right side surface for a bead 50 and a spring 51 behind the bead 50 and a flat cap 52 of a slide device 5 to fit therein, and then the round surface of the bead 50 contacts with the outer edge of the ear 42 to permit the lock rod 40 to rotate rightwards easily, as shown in FIGS. 6 and 7.

1. If the automobile steering lock 1 in the locked condition in the locked condition is to be unlocked, the key 6 is inserted in the keyhole 401 of the lock rod 40, and rotated to force the engage lug 402 shrink inward, separating from the engage groove 434 in the center through hole 433, and then the lock rod 40 is pulled out of the interior of the cover 2 and the center through hole 433 of the fix block 43 and rotated rightwards, (with FIGS. 4–7 referred). Then the lock rod 40 no longer locks the steering wheel 3, with the hooking member 20 separating from the steering wheel 3, finishing unlocking the lock in the invention.

Figure 8:
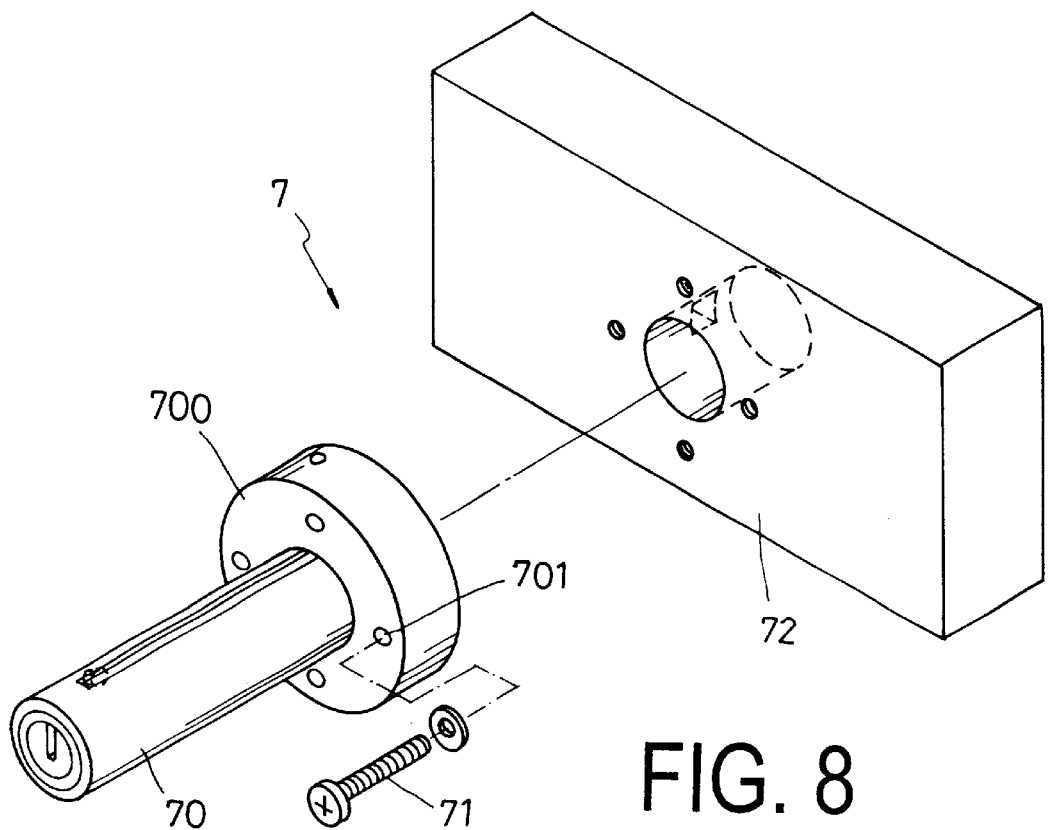
FIG. 8 is an exploded perspective view of another embodiment of a locking device in the present invention; and, FIG. 9 is a cross-sectional view of the lock rod of the locking device being moved out in the present invention.
Figure 9:
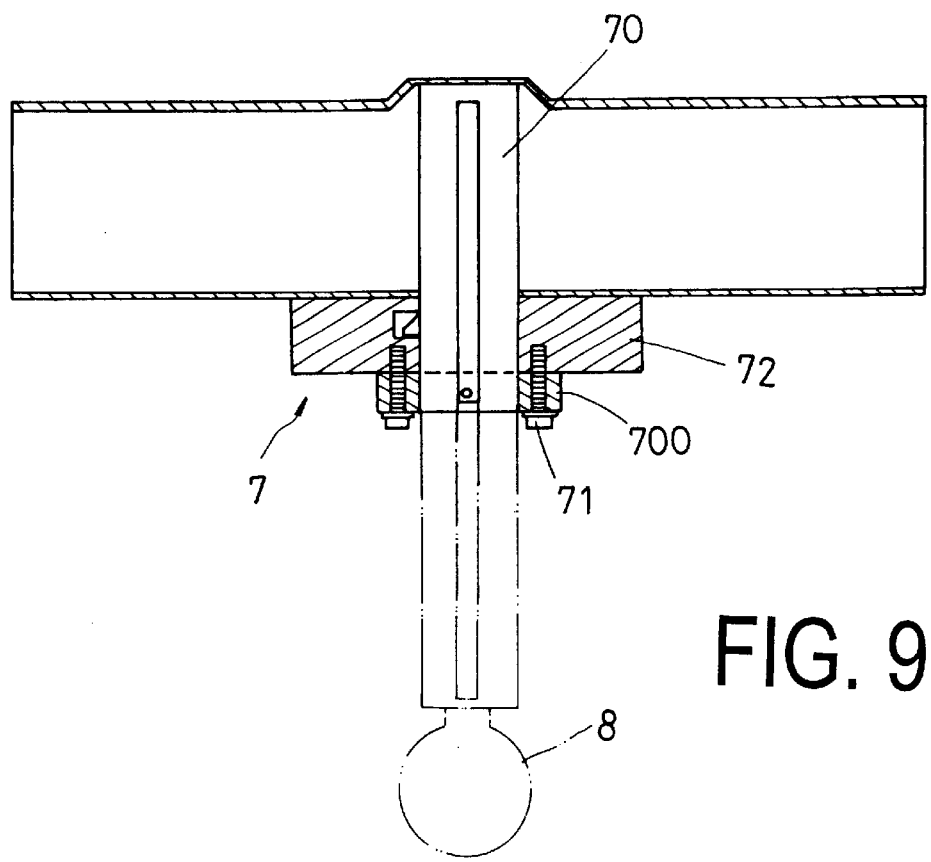

2. Next, FIGS. 8 and 9 show another embodiment of a locking device 7 in the invention, which has a lock rod 70, and a disc 700 having a center through hole for the lock rod to pass through. The disc 700 is fixed tightly with the fix block 72 with screws 71 engaging holes 701 bored around the center through hole and holes in the fix block 72. When the key 8 unlocks the lock 1, the lock rod 70 is pulled out and then the steering lock may be taken off the steering wheel 3. On the contrary, the steering lock may be locked on the steering wheel by repeating reversely the steps described above.

3. The automobile steering lock in the invention has the advantages as follows:

1. It can lock the steering wheel in three directions, protecting a safety air bag on the center of the steering wheel form taken off, and with the press rod pressing on the panel board, and then locked.
2. In unlocking, the lock rod is pulled out by means of a key, and then rotated rightwards, permitting the steering lock taken off the steering wheel, ready for next use and convenient to put it away.
3. It has a simple structure and convenient to use.

What is claimed is:

1. An automobile steering lock comprising:

a sector-shaped cover having a hooking member formed to bend rearward in an upper side thereof and adapted to hook a part of a steering wheel of an automobile, a press rod pivotally connected to said hooking member and extending rearward for pressing down on a panel board of an automobile, and a curved member connected to a lower portion of said cover;

a locking device combined on said sector-shaped cover, comprising a lock rod, a disc and a fix block, said lock rod having an elongate slot formed in an upper side thereof and passing through and sliding back and forth in a center hole of said disc without falling off said disc, said disc having an ear with a hole extending backwards from a right side of an inner end surface thereof, said fix block having a center through hole for said lock rod to pass through and a lengthwise aperture provided to communicate with a right side of said center through hole for receiving said ear of said disc, said fix block further having a pin hole in an upper side thereof and, a fix pin passes through the pin hole to fit in said hole of said ear to connect pivotally said ear with said fix block so that said lock rod may rotate rightwards with said fix pin functioning as a pivot; and, a key inserted in a key hole in said lock rod, said key is rotated to permit said lock rod to be pulled outwards and then be rotated rightwards in order to unlock said automobile steering locking with said sector cover covering a part of the steering wheel.

2. The automobile steering lock as claimed in claim 1, wherein said fix block of said locking device further comprises a hole in a side near said lengthwise aperture for receiving a slide device comprising a bead, a spring behind said bead and a flat cap, said bead contacting a side edge of said ear of said disc by resilience of said spring to permit rightward rotation of said lock rod.

3. An automobile steering lock comprising:

a cover having a hooking member formed in an upper end thereof, the hooking member bent rearwards and adapted to hook on to a part of a steering wheel of an automobile, a press rod pivotally connected to said hooking member and extending rearwards, and a curved member connected to a lower portion of said cover;

a locking device comprising a lock rod, a disc and a fix block, said disc fixed firmly on said fix block by means of screws engaging holes of said disc and said fix block; and, said lock rod pulled out by inserting a key in said lock rod to unlock said steering lock so that the automobile steering lock is taken off a steering wheel, said steering lock lockable on a steering wheel of an automobile by reattaching the automobile steering lock on a steering wheel and locking the automobile steering lock with said key.

4. The automobile steering lock as claimed in claim 1 or 3, wherein said cover further has projecting curved reinforcing strips on two sides of an upper portion, a lateral projecting straight reinforcing strip formed on a center of a lower portion, said curved member adhered on a rear surface of a lower portion of said cover, said curved member having a projecting curved reinforcing strip and a recessed lateral surface formed on an upper end to be adhered on said rear side of said cover.

5. The automobile steering lock as claimed in claim 1 or 3, wherein said lock rod has an engage lug shrinkable to engage in an engage groove formed in said center through hole of said fix block so that said engage lug extends in said engage hole to lock said locking device when a key rotates said lock rod, or shrinks in said lock rod to unlock said locking device when the key rotates reversely said lock rod.

* * * * *